Patented Nov. 21, 1944

2,363,042

UNITED STATES PATENT OFFICE 2,363,042

DYES OF THE ANTHRAQUINONE SERIES

Edwin C. Buxbaum, Media, Pa., assignor to E. I. du Pont de Nemours & Company, Wilmington, Del., a corporation of Delaware No Drawing. Application October 24, 1942, Serial No. 463,247

5 Claims. (Cl. 260—303)

This invention relates to the preparation of new dyes of the anthraquinone series, and more particularly to the preparation of new diaminoisothiazoleanthrone compounds particularly useful as dyes for wool, silk, nylon and cellulose acetate, and for use as intermediates in the preparation of new vat dyes.

While in the anthraquinone vat dye class several dyes have been produced which contain the isothiazoleanthrone nucleus, there has been little work done in producing wool, silk, or cellulose acetate dyes containing this nucleus, probably because the ones investigated appeared to retain the known tendency of the nucleus to give colors which dye in yellow and brown shades. See German Patent 650,057.

The present invention has for its object the preparation of a new series of dyes of the anthraquinone class which dye in green and blue shades and which are useful not only for the dyeing of wool and silk, but which are also useful in the dyeing of nylon and cellulose acetate and for the coloring of gasoline and other petroleum oil fractions, and which may serve as intermediates for the preparation of new vat dyes.

These new dyes of the isothiazoleanthrone series, which dye in green and blue shades, can be produced by introducing amino or substituted amino groups into the isothiazoleanthrone nucleous in the 5- and 8-positions. The benzene ring of the isothiazoleanthrone molecule which carries the amino groups may also carry, as a further substituent, halogen or a sulfonic acid radical. The compounds of the present invention therefore have the following general formula in the unsulfonated form:

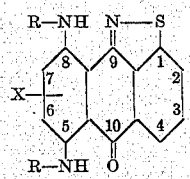

in which each R stands for a substituent of the group consisting of H, alkyl, aralkyl, cycloalkyl, acidyl, sulfonyl and aryl of the benzene or naphthalene series, and in which X stands for H, halogen, or the sulfonic acid group.

According to this invention a new and very valuable class of colors can be produced in the anthraquinone series, starting with the relatively inexpensive 1-nitro-5-anthraquinone-sulfonic acid or 1-nitro-8-anthraquinone-sulfonic acid, thus making available a large number of colors varying in shade from those already available and in some cases permitting the preparation of less expensive colors of equal or improved properties to replace those employed today. The 5-amino-, or 8-amino-1,9-isothiazoleanthrones, or the corresponding alkylaminoisothiazoleanthrones employed as the intermediates in the preparation of the colors of this series, are prepared by the known methods, such as by the treating of the 1-amino-5-anthraquinone sulfonic acid or the corresponding 1-nitro-derivative with sodium sulfide, sulfur and an alkylamine or ammonia. The aminoisothiazoleanthrone is then halogenated, or the amino group may first be acylated and then the product may be halogenated. The halogen is thus introduced in the 8-, or the 6- and 8-positions, depending upon whether the amine group is substituted or not and the nature of the substituted amine group. The halogen in the 8-position is then readily substituted by a large variety of amines or ammonia, and the free amine may be acylated by known methods. It is thus possible to produce a large number of new compounds which vary in shade in the green and blue range.

The following examples are given to illustrate the invention. Parts used are by weight.

Example 1

One hundred and fifty-one parts of 5-amino-1,9-isothiazoleanthrone are suspended in 660 parts of nitrobenzene. The suspension is heated to 135°–140° C. until all water has been removed. It is then cooled to 85° C. and there are then added 3 parts of iodine. The mass is heated to 85° C. and there is then added, over a period of four hours, a mixture of 102 parts of bromine and 102 parts of sulfuryl chloride. When the bromination has been completed the mass is cooled to room temperature, filtered, washed with nitrobenzene and alcohol, and finally with hot water. It is dried at 100°–110° C. The orange colored compound which is formed consists of 5-amino-6,8-dibromo-1,9-isothiazoleanthrone. It has a melting point of 273° C.

Twenty-one parts of this product are mixed with 80 parts of aniline, 20 parts of ammonium acetate, 60 parts of water, and 0.3 part of basic copper acetate, and the mixture is heated with agitation at reflux temperature for a period of eight hours. It is then cooled and diluted with 160 parts of ethyl alcohol. The precipitated compound is filtered off, washed and dried. It consists of 5-amino-6-bromo-8-anilino - 1,9 - isothiazoleanthrone, which dissolves in strong sulfuric acid with a red-brown color and gives a reddish-blue solution in organic solvents.

*Example 2*

Fifty-one parts of 5-amino-1,9-isothiazoleanthrone are dissolved in 200 parts of 93% sulfuric acid. When solution is complete, the acid mass is poured into 1300 parts of cold water. There is then added, over a period of ten hours at 25°–35° C., 342 parts of a sodium bromide-sodium bromate solution containing 6.96% of sodium bromate and 9.35% of sodium bromide, which effects the introduction of two atoms of bromine. When the bromination is finished, the suspended compound is filtered off, washed acid-free and dried. It is identical with the product prepared in Example 1 and consists of 5-amino-6,8-dibromo-1,9-isothiazoleanthrone.

Twenty-one parts of this product are added to 160 parts of p-toluidine, 10 parts potassium acetate and 0.2 part of basic copper acetate. The mixture is heated to 140°–145° C. for five hours. It is then cooled to 80° C., and there are then added 320 parts of ethyl alcohol. The diluted reaction mass is filtered and the filter cake is washed and dried. The resulting 5-amino-6-bromo-8-p-toluidino-1,9-isothiazoleanthrone dissolves in benzene, gasoline and other organic solvents with a bright blue color of good tinctorial strength. It dissolves in strong sulfuric acid with a yellow-brown color which changes to a bright yellow-green upon the addition of trioxy-methylene. The compound has a melting point of 226.5° C.

*Example 3*

5-amino-1,9-isothiazoleanthrone is benzoylated in ortho-dichloro-benzene with benzoyl chloride to form 5-benzoyl-amino-1,9-isothiazoleanthrone. This compound is then suspended in a mixture of glacial acetic acid and nitrobenzene and heated to 100°–105° C. Sufficient chlorine is then added until one atom of chlorine has been introduced.

Eight parts of the resulting 5-benzoylamino-8-chloro-1,9-isothiazoleanthrone are heated with 100 parts of aniline, 5 parts of potassium acetate and 0.25 part of basic copper at a temperature of 170°–180° C. for a period of two to three hours. The reaction mass is then cooled, diluted with ethyl alcohol, filtered, washed and dried. The resulting 5 - benzoyl - amino - 8-anilino-1,9-isothiazoleanthrone is a dark blue powder which dissolves in benzene, gasoline and other organic solvents with a pure blue color. It dissolves in concentrated sulfuric acid with a maroon color which changes to a grayish black upon the addition of trioxymethylene. It has a melting point of 248° C.

*Example 4*

Twenty parts of the 5-benzoylamino-8-anilino-1,9-isothiazoleanthrone prepared as in Example 3 are dissolved in 200 parts of 93% sulfuric acid. The temperature is then gradually raised until the sulfonation is complete, as evidenced by the complete solution of a drop of the acid solution in a few cc. of water. The sulfonation mass is poured into 1500 parts of water, filtered off and washed acid-free with brine.

The dye obtained exhibits good application properties and dyes wool from an acid bath in level blue-gray shades which change to a pure gray on chroming. Its fastness to fulling is good.

*Example 5*

Fifty-nine parts of 5-benzolyamino-1,9-isothiazoleanthrone are suspended in 264 parts of nitrobenzene. The mass is heated to 135°–140° C. and held until completely dehydrated. It is then cooled to 85° C. and 1 part of iodine is added. There is then added a previously prepared mixture of 16 parts of bromine and 16 parts of sulfuryl chloride over a period of four hours at 85° C. The bromination mass is then cooled to 30° C., filtered, washed with nitrobenzene, then with alcohol, then with hot water, and dried. This resulting 5-benzoylamino-8-bromo-1,9-isothiazoleanthrone is hydrolized in 93% sulfuric acid at 70°–80° C. to give the 5-amino-8-bromo-1,9-isothiazoleanthrone, which is a bright orange powder with a melting point of 255° C.

Twenty-five parts of the 5-amino-8-bromo-1,9-isothiazoleanthrone are heated with 200 parts of p-toluidine, 13 parts of potassium acetate and 0.5 part of basic copper acetate at 170°–180° C. for six hours. After cooling, the condensation mass is diluted with ethyl alcohol and filtered. The resulting 5-amino-8-p-toluidino-1,9-isothiazoleanthrone is a blue product which dissolves in organic solvents, such as benzene and gasoline, with a pure blue color of excellent tinctorial strength.

In place of p-toluidine, alpha- or betanaphthylamine may be employed to give the corresponding 5-amino-8-naphthylamino-1,9-isothiazoleanthrone.

*Example 6*

Five parts of 5-amino-8-p-toluidino-1,9-isothiazoleanthrone are dissolved at 30° C. in 100 parts of sulfuric acid monohydrate. When sulfonation is complete, the acid mass is poured into 450 parts of ice and water and the product filtered off, washed acid-free with brine and dried.

This sulfonic acid derivative dyes wool in bright blue shades, and has good leveling properties. Other arylamino compounds can be used in place of the p-toluidine to give a variety of other shades, all of which exhibit the same brightness and good application properties. For instance, sulfonated 5-amino-8-anilino-1,9-isothiazoleanthrone dyes in red-blue shades; sulfonated 5-amino-8-p-xylidino-1,9-isothiazoleanthrone dyes in navy blue shades, and sulfonated 5-amino-8 - orthotoluidino - 1,9 - isothiazoleanthrone dyes a reddish-blue on wool, which is not as red as the anilino-derivative.

*Example 7*

Sixty-three and one-half parts of 5-methylamino-1,9-isothiazoleanthrone, prepared as described in Ann. 393, 191 by Gattermann, are dissolved in 500 parts of nitrobenzene containing 30 parts of sodium carbonate. The mass is heated to 90° C. and, while holding at this temperature, there are added 28 parts of bromine. After cooling, the newly formed 5-methylamino-8-bromo-1,9-isothiazoleanthrone is filtered off, washed and dried.

Ten parts of the 5-methylamino-8-bromo-1,9-isothiazoleanthrone is reacted with 100 parts of para-toluidine in the presence of five parts of potassium acetate and 0.2 part of basic copper acetate at 170°–180° C. for six hours. The mass is cooled and diluted with ethyl alcohol. The newly formed 5-methylamino-8-toluidino-1,9-isothiazoleanthrone precipitates in excellent crystalline form. This compound dissolves in organic solvents with a greenish-blue color, and has very good tinctorial strength in gasoline. When sulfonated by any of the usual methods it gives a dye of good application properties which colors wool in bright greenish-blue shades. By substituting other amines such as aniline, xylidines, anisidine, amino-diphenyl ether, or amino-diphenyl, wool dyes of modified shades can be obtained.

*Example 8*

One hundred and twenty-six parts of 5-amino-1,9-isothiazoleanthrone are suspended in 650 parts of ortho-dichlorobenzene and heated to 150°–160° C. until completely dehydrated. The mass is cooled to 20°–25° C., and 64 parts of chlorosulfonic acid are then added at 20°–25° C. over a period of from one to two hours. The temperature is raised to 152° C. over a period of two hours and held at this temperature for ten hours. The mass is then cooled to 60°–70° C., made alkaline with soda ash, and then steam distilled free of solvent. The water soluble sodium sulfonate of 5-amino-1,9-isothiazoleanthrone is acidified with 124 parts of 78% sulfuric acid. There is then added, over a period of ten hours at 20°–25° C., a solution of 58 parts of mining salts in 250 parts of water. The mass is heated to the boil, boiled 30 minutes, and filtered hot. The filtrate is neutralized with sodium carbonate, and the brominated sodium sulfonate of 5-amino-1,9-isothiazoleanthrone is precipitated out of the solution, filtered off, washed with cold water and dried. Five parts of the 5-amino-8-bromo-1,9-isothiazoleanthrone-sodium sulfonate is boiled for two hours with 15 parts of cyclohexylamine, 3 parts of sodium carbonate, 0.25 part of copper sulfate, 20 parts of ethyl alcohol and 225 parts of water. The bronze-colored 5-amino-8-cyclohexyl-amino-1,9-isothiazoleanthrone sodium sulfonate which separates out is filtered off after cooling, washed, and dried. It has good application properties and dyes wool in clear reddish-blue shades.

*Example 9*

Forty-three and one-half parts of 5-benzoyl-amino-8-bromo-1,9-isothiazoleanthrone are heated with 22 parts of paratoluene sulfonamide, 13 parts of sodium carbonate, 1.0 part of cuprous chloride and 225 parts of ortho-dichloro-benzene at reflux temperature for three hours. When the reaction is completed, the mass is cooled to 80° C. and diluted with 300 parts of ethyl alcohol. The crystalline 5-benzoylamino-8-p-toluene-sulfonamido-1,9-isothiazoleanthrone is filtered off, washed with alcohol and hot water, and dried.

Forty-two parts of this compound are dissolved in 340 parts of 96% sulfuric acid at 30° C. and held at this temperature until hydrolysis of this compound has taken place. The resulting 5-benzoylamino-8-amino-1,9-isothiazoleanthrone is a violet colored compound with a melting point of 313° C. It is a useful intermediate for further condensation, particularly in the vast dye field.

By treating the above compound in 82% sulfuric acid at from 90°–100° C., the 5,8-diamino-1,9-isothiazoleanthrone is obtained which is a violet compound with a melting point of 261° C. It dissolves in concentrated sulfuric acid with a yellow color which changes to bright green upon the addition of trioxy-methylene. It exhibits excellent affinity for the cellulose acetate fiber, which it colors in deep reddish-blue shades. It also dyes nylon in reddish-blue shades differing somewhat from the color on cellulose acetate, and exhibits good application properties.

I claim:

1. The 1,9-isothiazoleanthrone compounds of the formula:

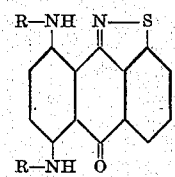

in which each R stands for a substituent of the group consisting of H, alkyl, aralkyl, cycloalkyl, acidyl, sulfonyl and aryl of the benzene and naphthalene series, and the halogen and sulfonic acid derivatives of said compounds, the halogen when present in the molecule being in one of the positions 6 and 7.

2. The 1,9-isothiazoleanthrone compounds of the formula:

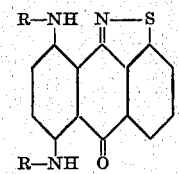

in which each R stands for a substituent of the group consisting of H, alkyl, aralkyl, cycloalkyl, acidyl, sulfonyl and aryl of the benzene and naphthalene series.

3. 8-anilino-5-amino-1,9-isothiazoleanthrone.

4. 8-toluidino-5-methylamino-1,9-isothiazoleanthrone.

5. 5,8-diamino-1,9-isothiazoleanthrone.

EDWIN C. BUXBAUM.